(12) United States Patent
Konow

(10) Patent No.: US 7,744,483 B2
(45) Date of Patent: *Jun. 29, 2010

(54) ELECTRONICALLY TRACEABLE GOLF CLUB INCORPORATING A PROGRAMMABLE TRANSPONDER

(76) Inventor: Blaine L. Konow, 4727 W. Villa Linda Dr., Glendale, AZ (US) 85310

( * ) Notice: Subject to any disclaimer, the term of this patent is extended or adjusted under 35 U.S.C. 154(b) by 1076 days.

This patent is subject to a terminal disclaimer.

(21) Appl. No.: 11/328,634

(22) Filed: Jan. 10, 2006

(65) Prior Publication Data

US 2006/0122002 A1   Jun. 8, 2006

Related U.S. Application Data

(63) Continuation of application No. 10/118,527, filed on Apr. 5, 2002, now Pat. No. 7,004,848, which is a continuation-in-part of application No. 09/332,466, filed on Jun. 14, 1999, now abandoned.

(51) Int. Cl.
  A63B 57/00 (2006.01)
  A63B 69/36 (2006.01)
  A63F 9/24 (2006.01)

(52) U.S. Cl. .................. 473/222; 473/223; 473/226; 463/42

(58) Field of Classification Search ........... 473/169, 473/222–223, 226, 291, 131; 340/10.1; 463/42

See application file for complete search history.

(56) References Cited

U.S. PATENT DOCUMENTS

| | | | |
|---|---|---|---|
| 1,830,936 A | 11/1931 | Faith | |
| 1,914,781 A | 6/1933 | Mattern | |
| 1,942,122 A | 1/1934 | Reach | |
| 4,510,495 A * | 4/1985 | Sigrimis et al. | 340/10.34 |
| 4,656,463 A | 4/1987 | Anders et al. | |
| 4,698,781 A | 10/1987 | Cockerell, Jr. | |
| 4,827,395 A | 5/1989 | Anders et al. | |
| 5,097,416 A * | 3/1992 | Matthews | 700/91 |
| 5,104,457 A | 4/1992 | Viljoen et al. | |
| 5,245,332 A * | 9/1993 | Katzenstein | 340/10.52 |
| 5,438,518 A * | 8/1995 | Bianco et al. | 473/407 |
| 5,447,314 A * | 9/1995 | Yamazaki et al. | 473/353 |
| 5,487,542 A | 1/1996 | Foley | |
| 5,517,188 A | 5/1996 | Carroll et al. | |
| 5,525,967 A * | 6/1996 | Azizi et al. | 340/572.1 |
| 5,532,686 A * | 7/1996 | Urbas et al. | 340/10.51 |
| 5,548,291 A * | 8/1996 | Meier et al. | 340/10.34 |
| 5,611,406 A * | 3/1997 | Matsuzaki et al. | 180/167 |
| 5,616,832 A | 4/1997 | Nauck | |
| 5,743,815 A | 4/1998 | Helderman | |
| 5,796,338 A | 8/1998 | Mardirossian | |
| 5,800,282 A | 9/1998 | Hutin et al. | |
| 5,949,335 A * | 9/1999 | Maynard | 340/572.1 |
| 5,952,921 A | 9/1999 | Donnelly | |
| 5,973,596 A | 10/1999 | French et al. | |
| 6,057,762 A | 5/2000 | Dusza | |

(Continued)

*Primary Examiner*—John M Hotaling, II
*Assistant Examiner*—Ryan Hsu
(74) *Attorney, Agent, or Firm*—Douglas W. Rudy

(57) ABSTRACT

A golf club is provided with a transponder that will transmit a coded signal when polled. The transmitter is small enough to fit into the golf club and does not need an external power supply. A data base associated with the coded signal is a depository of information related to the golf club.

1 Claim, 4 Drawing Sheets

U.S. PATENT DOCUMENTS

| | | |
|---|---|---|
| 6,118,376 A | 9/2000 | Regester |
| 6,186,895 B1 * | 2/2001 | Oliver ........................ 463/25 |
| 6,263,279 B1 * | 7/2001 | Bianco et al. ............... 701/213 |
| 6,512,478 B1 | 1/2003 | Chien |
| 2002/0188359 A1 * | 12/2002 | Morse ........................ 700/91 |

* cited by examiner

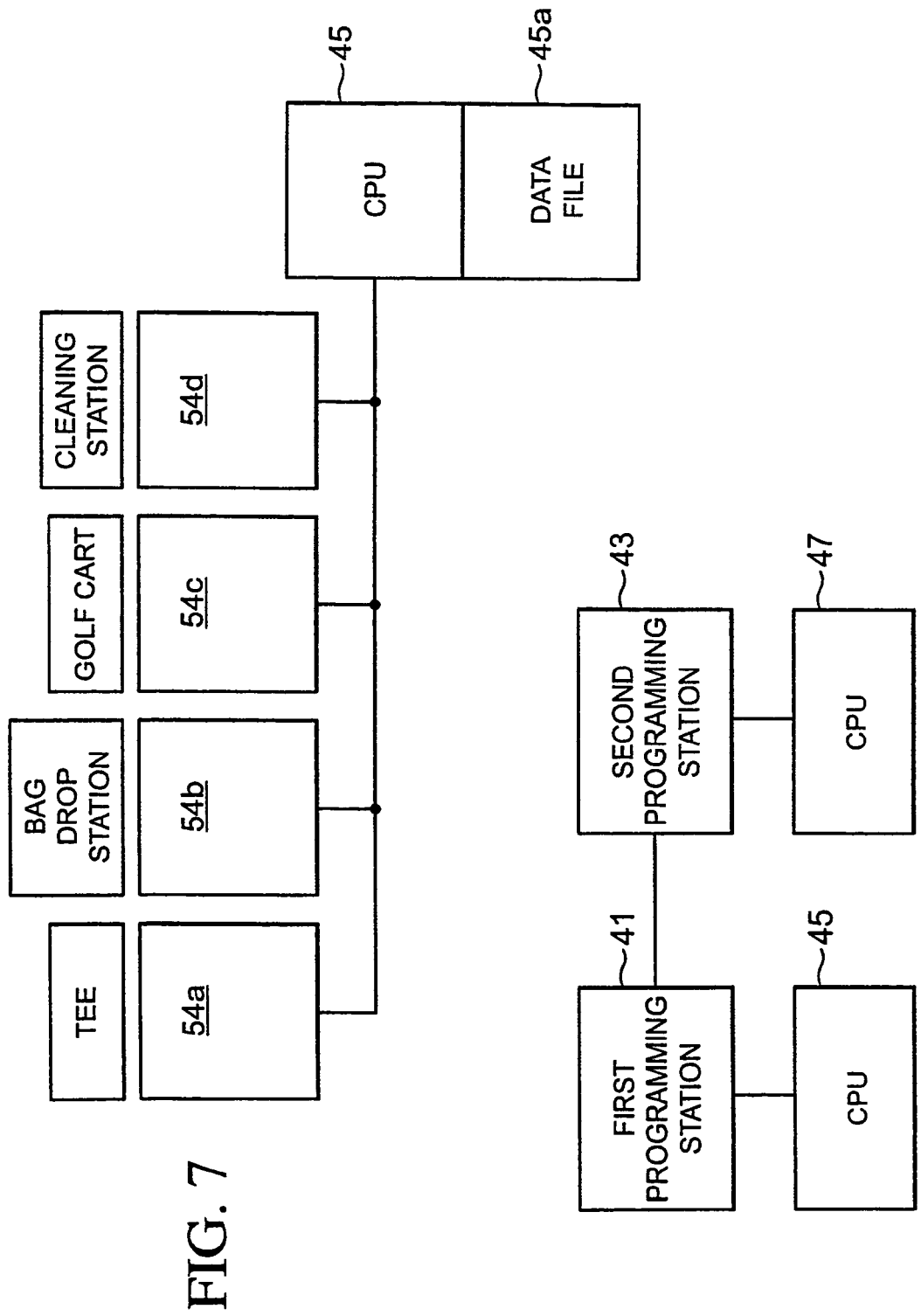

ELECTRONICALLY TRACEABLE GOLF CLUB INCORPORATING A PROGRAMMABLE TRANSPONDER

This application is a continuation of application Ser. No. 10/118,527, filed on Apr. 5, 2002, now U.S. Pat. No. 7,004,848, which is a continuation-in-part of application Ser. No. 09/332,466 filed Jun. 14, 1999, now abandoned.

FIELD OF THE INVENTION

This invention relates to an anti-theft and tracking device, and more specifically to a device that can be used to locate stolen golf clubs, firearms, or other portable personal possessions.

BACKGROUND INFORMATION

Theft of costly portable possessions, such as new high-tech golf clubs with titanium heads and graphite shafts, is increasing at an alarming rate. For example, the theft of titanium golf clubs from golf equipment shops is so frequent that titanium golf clubs are locked up independently of the other equipment in the store. To substantiate this fact are the numerous news stories depicting golf shop burglaries in which only the titanium or other exotic golf clubs have been stolen.

Many golf club manufacturers register golf clubs at the factory, and track the golf clubs by manual systems that are proprietary to the manufacturer. Typically this method requires the eventual owner of the clubs to fill out and send in a registration form and/or questionnaire. Because this manual tracking method is usually entirely dependent on the golf club owner, it is not always reliable.

Handguns present a similar tracking problem. Even though gun stores are traditionally more secure than golf shops, theft from guns stores is still a common occurrence. Probably even more common is the theft of firearms during house burglaries. All modern guns are stamped with a unique serial number by the manufacturer. For any gun sold at a gun shop, the serial number of the gun and name of the purchaser must be recorded in a database. However, when a gun is stolen, the serial number of the stolen handgun can be modified or ground off the gun. Once this occurs, future identification of the gun is almost impossible.

The art known to the inventor of this device is unsophisticated. For example, U.S. Pat. No. 1,914,781 to Mattern, Jr. et al., U.S. Pat. No. 1,942,122 to Reach, and U.S. Pat. No. 1,830,936 to Faith all teach using an end-cap or similar device attached to the grip end of the golf club for identification, ornamentation, or protection. None of these inventions uses hidden instrumentality or electronic transmitters for identification or tracking purposes. This type of system does not provide a means for tracking the object after purchase.

However, there are many products that are protected by electronic security systems. For instance, it is well known to provide security systems in commercial environments, such as retail establishments, libraries, and motor vehicles. For example, in retail establishments, retail items that are easily stolen are often times "tagged" with a magnetic element. If someone tries to remove the "tagged" item from the premise an alarm will sound. The only way to prevent the alarm from sounding is to remove or demagnetize the tag at the check-out station.

As mentioned above, often times manufacturers stamp or etch serial numbers on products such as golf clubs, guns, computers, stereos, personal water craft, boats and other valuable products that can be easily stolen. To circumvent someone from grinding off the serial number, such an identifying mark is often placed in a location that is hidden from casual observation. This is common practice on automobile components to serve as a deterrent in the trafficking of stolen car parts. However, it is still possible for someone to find and alter or remove the manufacturer's serial number, thus making ownership of the component hard to determine and almost impossible to track.

None of the prior art that the inventor is aware of provides for a method that not only helps determine ownership of a product, but also provides for the capability of determining when and where a product was used. A product of this type could be very beneficial in products such as golf clubs, handguns, airbags, personal watercraft, boats, computers and camcorders. It would therefore be possible for the owner or manufacturer to know when or where the product was used.

Therefore, a need exists for an anti-theft device to either locate stolen possessions or track portable possessions, such as golf clubs, handguns airbags, personal watercraft, boats computers and camcorders. The device of the invention would also be able to provide and record in a database useful information about the portable possessions, such as the name of the owner, date of purchase, where they have been, or other information deemed appropriate.

SUMMARY OF THE INVENTION

The invention is the implantation of a transmitter or transponder in an object such as a golf club. The transponder is encoded with a code specific identification mark such as a multi-digit code that is recorded in a database such that the database can be accessed to determine the ownership and other information. The code is initially entered at the manufacturing location and then, when the object is sold, the information regarding the buyer will be encoded into the transmitter/transponder.

The invention uses a very small transponder that can be programmed with various information after the transponder is affixed in or to the object to be protected. The transponder may be an elongated cylindrical element. An alternative design is a thin, flat element that can be adhesively affixed in place.

A second component of the invention is a programming station that is used to reprogram the information in the transponder so that the information, after being initially entered, can be subsequently updated as necessary. The programming station will include hardware that can be used to not only reprogram the transponder but also can be the repository of data base information. The data base information can be accessed remotely and can be updated as appropriate.

The overall object of this invention is to provide a registration system that can be incorporated in a transportable object that will identify that object for purposes of data base comparisons. The data base comparison can be used for tracking the object. The tracking is usable for numerous purposes including notification in the event of a theft of the device. It is also useful for determining the location where the object was used and compiling data as to the pattern of use of the device or object. A further use is to track the whereabouts of the object as it progresses past various checkpoints. For instance, in the example where the object is a golf club, the use of the golf club at each tee on a golf course would be helpful in tracking the location and speed at which a golfer is progressing from tee to tee along the course. Using this method allows the golf course personnel the ability to track the flow of the golf course without leaving the clubhouse.

It is also an object of this invention to provide a programmable transponder that may be inserted into an object at the point of manufacture or, at the time of retrofitting the object. A related object is to provide a device that can be used to register the presence of the object user in a certain location, such as at the bag drop of a golf course, or on the premises of a gun club.

It is also an object of this invention to provide a transponded signal reader at various locations where it is expected that the object tagged with the transponder will pass. For instance, it is expected that golf clubs will pass through the bag drop station of a golf course, the clubs will pass proximate the tee boxes on the course, and the clubs may pass through a cleaning station where golf clubs can be cleaned after a round. Such a transponder signal reader may also be used in numerous other locations such as at a selling dealer, golf pro shop or golf club repair shop.

Another advantage of this invention is that it can be used to help in the collection of a database that will be useful in building a demographic model of the frequented locations for the object. Such information is useful not only in tracking the club for anti-theft consideration but also in developing a marketing pattern that is specific to that tagged object and with other tagged objects of similar genre.

The preferred embodiments of the invention presented here are described below in the Figures and Detailed Description. Unless specifically noted, it is intended that the words and phrases in the specification and the claims be given the ordinary and accustomed meaning to those of ordinary skill in the applicable arts. If any other special meaning is intended for any word or phrase, the specification will clearly state and define the special meaning.

Likewise, the use of the words "function" or "means" in the Detailed Description is not intended to indicate a desire to invoke the special provisions of 35 U.S.C. 112, Paragraph 6, to define the invention. To the contrary, if the provisions of 35 U.S.C. 112, Paragraph 6 are sought to be invoked to define the inventions, the claims will specifically state the phrases "means for" or "step for" and a function, without also reciting in such phrases any structure, material or act in support of the function. Even when the claims recite a "means for" or "step for" performing a function, if they also recite any structure, material or acts in support of that means or step, then the intention is not to invoke the provisions of 35 U.S.C. 112, Paragraph 6. Moreover, even if the provisions of 35 U.S.C. 112, Paragraph 6 are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, material or acts for performing the claimed function.

BRIEF DESCRIPTION OF THE DRAWING FIGURES

A preferred embodiment of the invention will now be described by way of example with reference to the accompanying drawings. Although several embodiments of the invention are shown and described, like reference numbers identify like parts in each of the figures, in which:

FIG. 7 is a chart showing sensing stations, a CPU and a data file;

FIG. 8 is a chart showing a first and second programming stations each in communication with a CPU.

DETAILED DESCRIPTION OF THE DRAWINGS

Figures 1, 2, 3:
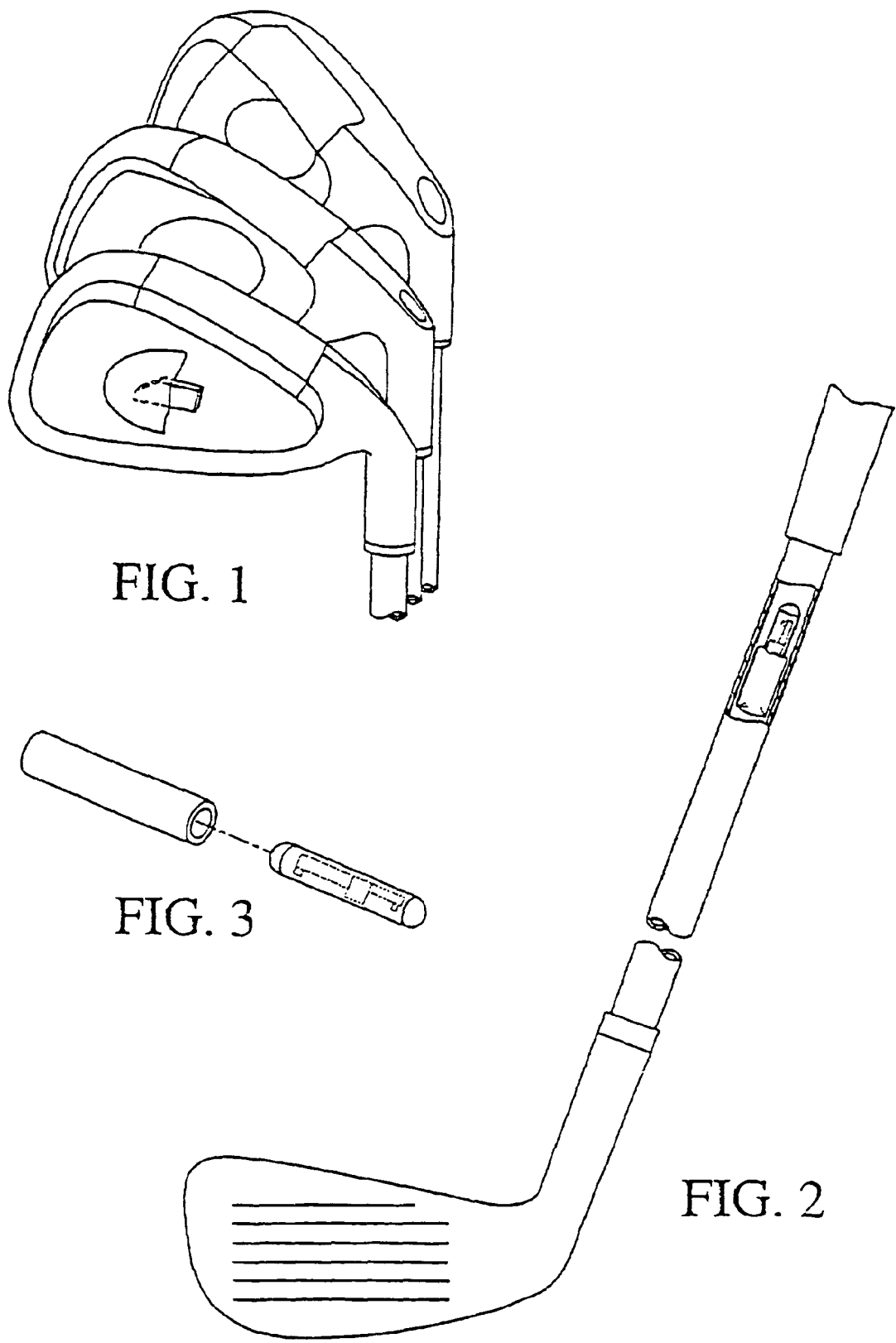
FIG. 1 is a representation of a set of golf clubs showing the club heads with a transponder element partially revealed from under a partially removed overlay.
FIG. 2 is a representation of a golf club showing a truncated shaft and a portion of the shaft removed to reveal a transponder.
FIG. 3 is an illustration of a transponder removed from a pliable tube normally used to support the transponder.

The invention herein can be easily envisioned by reviewing the drawings starting with FIG. 1. In this figure a set of three golf clubs is shown. A first club 10 includes a shaft 12 that is inserted into the hossel 14 of the head 16 of the golf club 10. The golf club shown is a cavity back club having a recessed area 20 surrounded by a perimeter 22. Inside the recessed area is an onlay 24 of epoxy, plastic or other non-metallic substance. The onlay 24 is only a portion of a complete onlay that in this illustrated example would be an oval shaped element of which only about a half is shown. Located between the onlay 24 and the surface of the cavity 20 of the club head 16 is a transponder 26.

The transponder 26 is a small light weight element that in the preferred embodiment of the invention is about 1 mm thick, 10 mm long and 3 mm wide. It has a truncated corner at one end. It will be referred to as a "wedge" transponder hereinafter.

The golf clubs 10 of FIG. 1 can also include a removable section 30 in the sole portion 31 of the club. In an alternative embodiment the wedge can be inserted below and underneath the removable section 30 of the golf club.

FIG. 2 is a golf club 10 as shown in FIG. 1. In this figure more of the shaft 12 is shown. The shaft is terminated in a grip section 32 shown partially in this figure. Just below the grip section of the club the shaft has been partially broken away to reveal the placement of a transponder 36. This may be termed a "capsule" transponder. In this embodiment the transponder is encased in a tight fitting tubular structure 40 of pliable material. The pliable tube 40 is press fit in the shaft 12. It has been determined that locating the capsule shaped transponder 36 in the shaft away from the hossel end of the shaft is the preferred placement.

The capsule transponder 36 is shown in FIG. 3 adjacent the pliable tube 40. The capsule transponder is an off the shelf transponder Model No. 2500 available from Texas Instruments. It is, as an example, a transponder that is sealed in a thermal set epoxy and then sealed in a glass tube. In one embodiment the glass tube and transponder are 3.8 mm in diameter and 23.0 mm long, and weighs 0.02 grams. The sensing distance of this transponder 36 is 12 to 18 inches. The pliable tube 40 can be a silicone rubber sleeve that adds a measure of shock resistance to protect the transponder 36 from impact shocks.

The capsule transponder 36 is capable of storing sixteen alphanumeric characters that can be either names directly inputted, or a code that is cross-referenced to a lookup table containing names, addresses and other desired information.

In a preferred embodiment it is expected that the capsule transponder 36 will be inserted in the shaft of a golf club and held in place by the friction between the interior shaft surface and the outer wall of pliable tube 40. It is also expected that the tube 40 could be adhesively or mechanically anchored in the interior of the shaft. It is also contemplated that the capsule transponder 36 could be epoxied or otherwise adhesively or mechanically fixed in a location inside the shaft 12.

Figure 4:
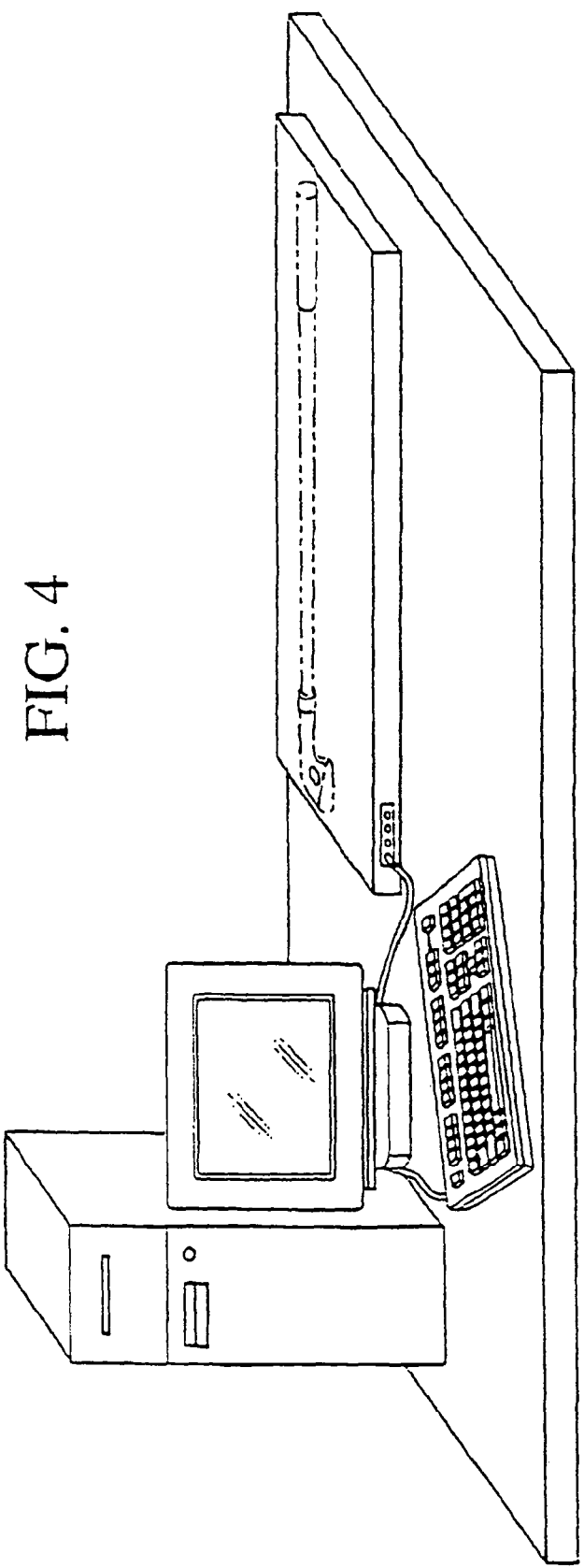
FIG. 4 is a representation of the equipment that can be used to "program" the transponder of FIG. 3.

FIG. 4 shows a pictorial representation of a programming station 41 that is used to program either a wedge transponder 26 or capsule transponder 36 which has been mounted or inserted in a golf club or other object. In this figure an input device 42 capable of sending a coded signal to the transponder anchored to the golf club is shown. The input device 42 will emit the necessary code that will be sensed by, received by, and coded into the transponder or multiple transponders on the golf club. The input device, the scanner, is also a product available from Texas Instruments. The input/output device will be connected to a central processing unit such as the computer 44, which is a general-purpose computer. I/O (input/output) is managed through a monitor 46, a keyboard 50 and a mouse, not shown-all of which is well known in the record management industry. Also well know is the use of a data base program in the computer. Such a data base would be referenced with the serial number either preassigned to the chip or subsequently coded into the chip of the capsule transponder 36 or wedge transponder 26. The data base program would incorporate at least identification information that would allow tracking of the club when the club is proximate a data reader. Types of information that can be stored in the database are names, addresses, and phone numbers of the owners; and dates of manufacture and sale of the clubs. In addition, the database could also contain information on the specifics of the object as well as specifics about where the golf club is currently, where it has been in the past, and whether or not the transponder has been modified, changed or otherwise tampered with. Other information could, of course, be incorporated in the database. It is expected that there are many data base or record keeping software products available that can index a reference number with data, and track, modify, update, and otherwise interface in a business sense with the information transponded by the transponders of the invention.

Figure 5:
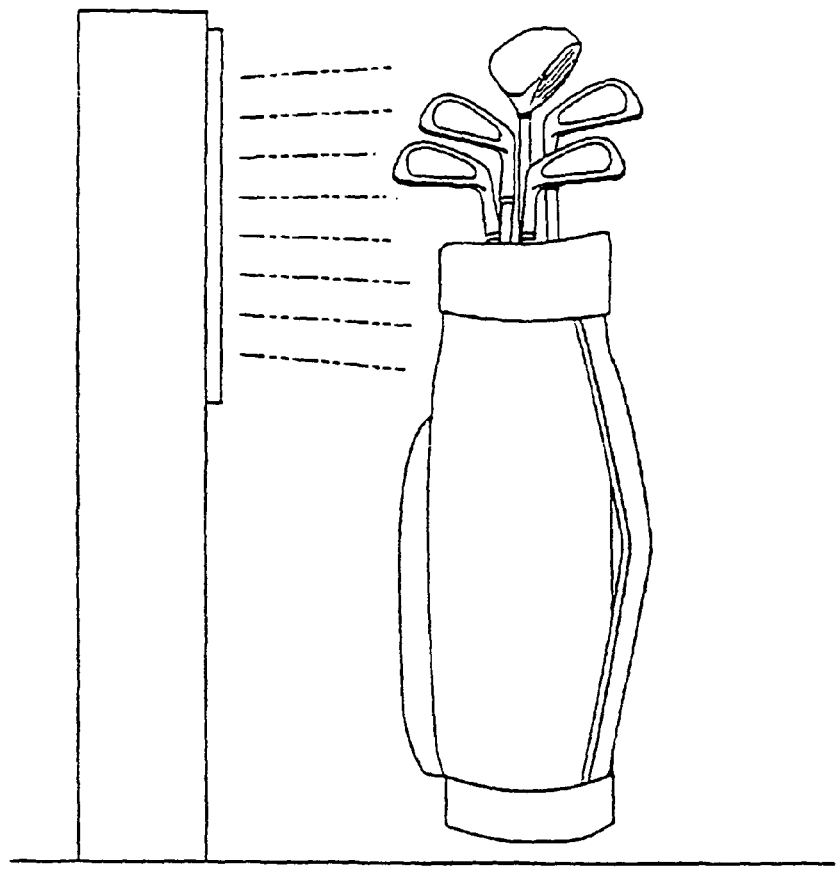
FIG. 5 is representation of a transponder signal reader adjacent or proximate a set of golf clubs.

FIG. 5 shows a golf bag 52 containing a set of golf clubs, one shown as item 10. In this embodiment, at least one of the clubs, such as club 10 is provided with a capsule transponder 36 or wedge transponder 26. In this depiction the golf clubs are adjacent a signal triggering and signal sensing station 54 including a zone equipped to receive signals sent out by the transponder or transmitters in the golf clubs. The signal triggering and sensing station is shown in a particular vertical cabinet depiction. However, it could be made to conform to any of numerous shapes, sizes or deployments to appropriately fit into a given environment. For instance, it may be desirable to mount the sensing unit on a golf cart, near a tee box, or at the golf club staging area at the bag drop. These mounting and placement configurations are just some of many contemplated by the inventor.

Figure 6:
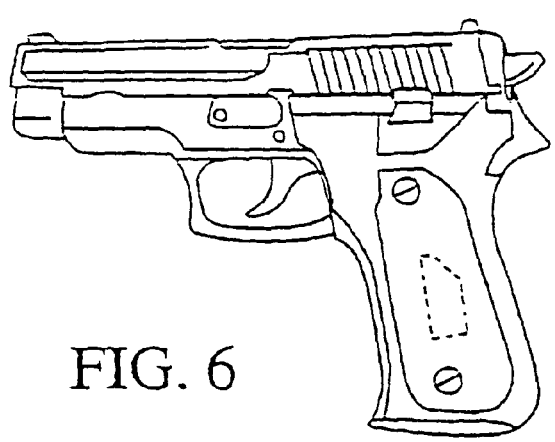
FIG. 6 is a representation of a transponder, shown in dotted line view, in a handgun.

A handgun is shown in FIG. 6. This is illustrative of the scope of the invention showing how the wedge transducer 60 can be incorporated in the grip 62 of the handgun 56. In this example the wedge transponder 60 will be formed in place, cast or inserted into, or adhesively affixed to the interior of the pistol grip 62.

The invention is contemplated as being especially adaptable to golf clubs and handguns, but not limited to these sporting goods. Other objects such as, rifles, shotguns, snow skis, tennis racquets, fishing equipment, power and non-powered tools, etc. are contemplated as being articles that could benefit from the use of the transponders. Given the limited range of the transponders disclosed in the preferred embodiment, it should be apparent that this invention would not be well suited in the tracking of automobiles, trucks, boats and the like. Devices such as those used to track stolen vehicles are specifically designed to address car and truck location detection. These systems are believed to incorporate transponders or transmitters that are much more powerful and have much greater range than the subject invention. Long-range transponders would not be necessary and would be detrimental to the performance of this invention. Long range transmissions would cause confusion, conflicting information and inconsistent information. However, the component parts of automobiles, such as radios, engines, fenders, doors and the like, may benefit from being tagged according to this invention.

An example of one scheme of the utilization of the invention would be as follows. The golf club manufacturer installs the capsule transponder 36, the so-called "smart chip," in the shaft of the club. A second wedge transponder 24 could be installed in the head of the club, or any combination of the two can be used. When the transponders 24 or 36 are passed within three to eighteen inches of the signal triggering and/or sensing station 54, the transponders would be activated in order to transmit the information that is programmed into them. Only authorized suppliers, dealers, golf pro shops and the like will be authorized to program the transmitter with the owners name, address, or other appropriate information. It is expected that the outside of the club head has a club serial number stamped, electro-etched or laser marked on the head of the club. This will help in preventing tampering with the serial number. A club that has a serial number ground off will immediately be suspected as being a stolen club. It would be expected that golf courses, clubs and resorts would require players to register their clubs at the clubhouse before playing. This would uncover the stolen clubs immediately. Even if the stolen clubs were not always discovered, the potential deterrent function would make people having stolen clubs consider the risk being caught.

Once an authorized supplier programs the transponder at his programming station, this being considered a first programming station, subsequent programming, for instance at a golf pro shop when the ultimate owner is identified, the transponder could be programmed with the owners name, address or other appropriate information not necessarily programmed at the first programming station. This subsequent programming would be done at a second, third, fourth or whatever subsequent programming station as is used to program information into the transmitter/transponder. It is expected that the outside of the club head has a club serial number stamped, electro-etched or laser marked on the head of the club. This will help in preventing tampering with the serial number. A club that has a serial number ground off will immediately be suspected as being a stolen club. It would be expected that golf courses, clubs and resorts would require players to register their clubs at the clubhouse before playing. This would uncover the stolen clubs immediately. Even if the stolen clubs were not always discovered, the potential deterrent function would make people having stolen clubs consider the risk being caught.

Another convenient place to locate the scanner/reader would be on the golf cart, because many of the better courses require the use of carts. The information can then be sent via radio communication to the clubhouse.

Whether the scanner is on the cart, in the bag drop area or on the tees at golf courses the scanner will sense the club serial numbers and transmit the numbers to the clubhouse computer. The computer will then compare the serial numbers to a hot sheet of stolen clubs provided by local law enforcement, the manufactures, or the club, etc. Of course, when a stolen club is identified it flags the clubhouse personnel to inform local law enforcement, or take other appropriate action.

An alternative scheme would track closely with the above, however the serial number would be a permanent number encoded in the transducer or transducers one time. From that point on whenever a change in ownership or other change in the club status was made the club would be scanned and the data screen related to the particular identifying number would be updated. Of course, appropriate security checks would be in place to make sure that the updating operation was legitimate.

In an alternative embodiment, a transponder could be located in a personal watercraft, such as a jet ski or boat. When the user enters a state park or lake, the transponder reader would pick up the signal from the personal watercraft when the vehicle is stopped to pay the usage fee. This would provide park personnel the ability to determine instantly whether or not a personal watercraft was stolen, as well as monitor the traffic flow into the lake or park.

It should be pointed out that much of the disclosure above is directed to golf clubs and to the irons in particular. Of course, as far as golf clubs are concerned "woods," putters, special drivers and the like are all candidates for the use of the transponders. Likewise, so are golf bags. As stated above, the golf club application is only one of many. Items that need to have the ability to transmit or transpond a signal a long distance, on the order of more than one or two meters are not contemplated as being of the type of item for which this invention is designed to apply. Nor is it intended to be applicable to transmitter and transponder-equipped systems that do not require constant or repeatable signal generation. For instance, the use of detectors in grocery stores, retail shops such as bookstores and the like, do not need a system that will tag an item for the life of the item. Nor do they need systems that can be updated with ownership changes or owner location information. Tracking a golf club as it passes from tee to tee or a shotgun at a skeet range that passes from stand location to location is not something that is currently contemplated by the anti-theft devices used in grocery stores and in retail stores.

In summary, among other inventions provided herein, one invention provided herein is an outside registration apparatus that includes the article, a golf club for instance, and a programmable transponder, programmed with identification that is attached to the article, indicia such as a multi-digit serial number or alphabet letter. The apparatus can have a cavity, such as the cavity back of a golf club, interior dimension similar to the exterior dimension of the transponder, or in the case of the cavity backed golf club the interior dimension will be larger than the exterior dimension of the transponder.

The preferred embodiment of the invention does not only provide security for golf clubs. It can also provide a large amount of other useful information to pro golf shops, golf club manufactures and golf courses. Such information could include a time and date stamp of where a golfer played, what clubs he used, and how often he plays. By tracking a set of clubs during play, the flow of play can be monitored and controlled. In addition, the use of this device could provide a wide selection of information that could be used for marketing purposes such as estimating golf club wear and tear, course selection, and average playing time.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the spirit and scope of the invention and the following claims.

The invention claimed is:

1. A cavity back golf club registration and tracking system comprising:
   the golf club provided with a head portion having a recessed area defined by a perimeter;
   a non-metallic onlay inside the recessed area;
   a programmable transponder located between the onlay and the surface of the recessed area, the transponder programmed with identification indicia, the transponder transmitting a signal corresponding to the identification indicia;
   a plurality of sensing stations, each located proximate a tee on a golf course, the sensing stations being a transmitted signal reader wherein each of the sensing stations communicates with a computer physically located at the golf course, the signal corresponding to the identification indicia transmitted by the transponder is read at each sensing station and the identification indicia is entered into the computer and the progression of the golf club from one sensing station to a second sensing station is recorded and capable of being displayed on the computer at the golf course; and
   whereby each of the sensing stations may record the presence of a particular golf club having specific identification indicia at a specific sensing station at a specific tee on the golf course.

* * * * *